R. H. STEWART, S. G. BLAYLOCK, R. VAUGHAN AND J. K. BATCHELDER.
PROCESS FOR THE EXTRACTION OF ZINC.
APPLICATION FILED OCT. 21, 1918.
1,320,805.
Patented Nov. 4, 1919.
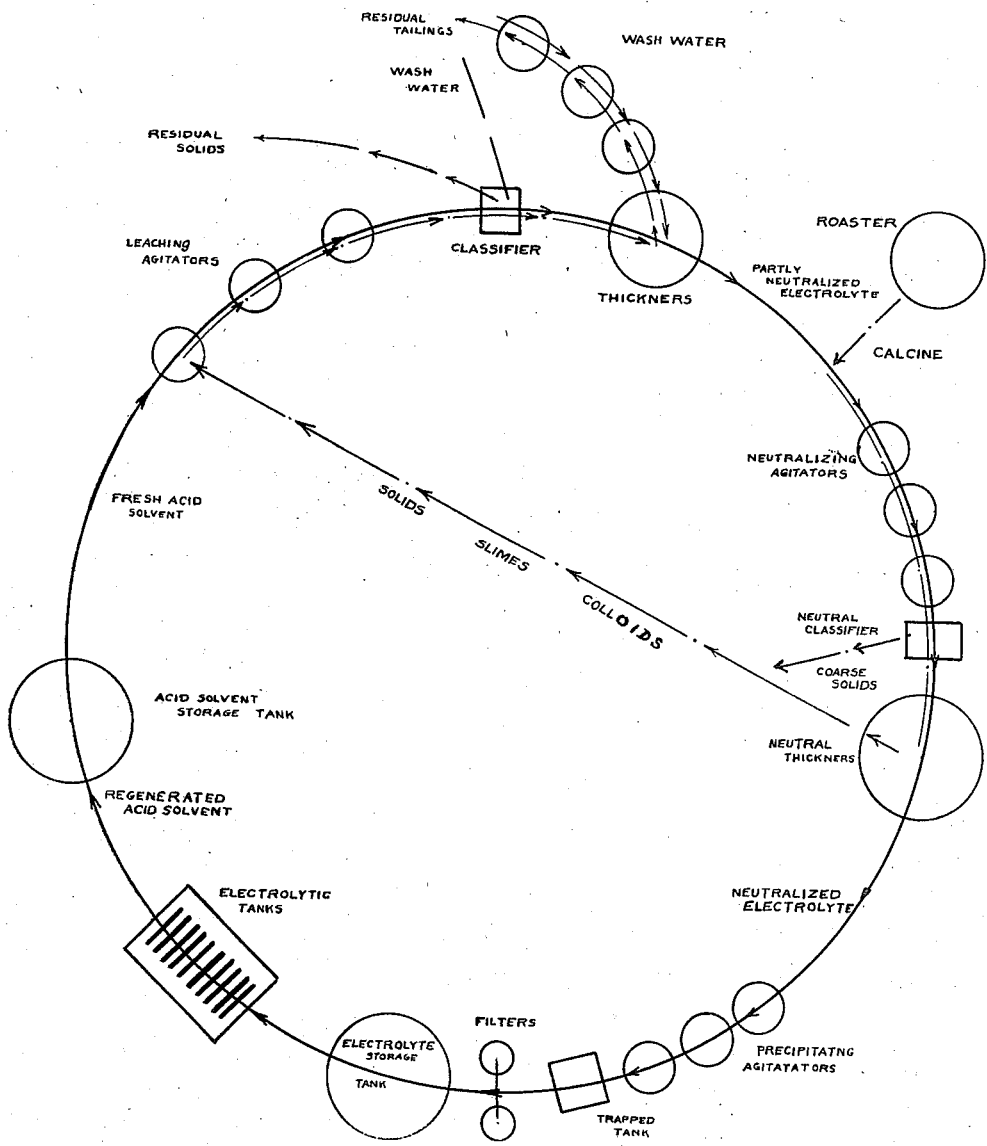

UNITED STATES PATENT OFFICE.

ROBERT HOLDEN STEWART, OF VANCOUVER, AND SELWYN GWILLYM BLAYLOCK, ROBERT VAUGHAN, AND JOHN KIMBALL BATCHELDER, OF TRAIL, BRITISH COLUMBIA, CANADA.

PROCESS FOR THE EXTRACTION OF ZINC.

1,320,805.  Specification of Letters Patent.  Patented Nov. 4, 1919.

Application filed October 21, 1918. Serial No. 259,021.

*To all whom it may concern:*

Be it known that we, ROBERT HOLDEN STEWART, of the city of Vancouver, in the Province of British Columbia, and SELWYN GWILLYM BLAYLOCK, ROBERT VAUGHAN, and JOHN KIMBALL BATCHELDER, of the city of Trail, in the said Province of British Columbia, Dominion of Canada, have invented a new and useful Process for the Extraction of Zinc; and we do hereby declare that the following is a full, clear, and exact description of the same.

This invention relates to a cyclical process for the hydrochemical extraction of zinc from its ores or zinc containing material, in which the zinc has previously been rendered soluble by roasting, and which is hereinafter called the "calcine", and the recovery of the zinc, as metallic zinc by electrolytic deposition; and the invention consists essentially of completing the neutralization of the acid solvent in an electrolyte, for the purification of the electrolyte, by the addition of unleached calcine containing an excess of soluble zinc, separating the solids and colloids from the neutralized electrolyte, precipitating those metals electro-negative to zinc out of the neutralized electrolyte by means of metallic zinc, eliminating the precipitated metals, and then electrolytically regenerating the acid solvent in the electrolyte by electrolytic deposition of the zinc as metallic zinc, leaching the residues, including the solids and colloids, which have been separated from the neutralized electrolyte, with the regenerated acid solvent, which then dissolves the soluble zinc from the solids and colloids, and thus becomes partly neutralized, separating the residual solids from the partly neutralized electrolyte, and returning it to that stage of the process where it receives the unleached calcine to repeat the cycle of the process.

In a preferred method of carrying out the process, the zinc in the ore, concentrates from the ore, or zinc containing material, may be brought to a soluble state by calcining under suitable conditions of time and temperature, to render as much zinc as possible soluble in dilute sulfuric acid, as zinc sulfate and (or) zinc oxid, and circumvent, or at least tend to circumvent, the formation of zinc iron compounds, the ore when calcined and the partly neutralized electrolyte, being delivered into the first of a series of agitators, in which agitation is maintained until the acid in the electrolyte becomes neutralized, the partly neutralized electrolyte in this case being the solution from the final leaching of the calcine in a later stage of the process.

The calcine is added at this stage, in order to throw sufficient zinc oxid into the partly neutralized electrolyte to insure it becoming thoroughly neutralized, even to the extent of dissolving some zinc oxid in the solution in excess of the amount required to neutralize the free acid. If the zinc oxid here added is sufficient, it flocculates the colloids in the mass and enables them to settle out of the solution, and to a large extent it purifies the solution. To insure thorough neutralization, the electrolyte is usually passed through four or five of these agitators.

From the last of these agitators, which for convenience will be termed "neutralizing agitators", the pulp, consisting of the neutralized electrolyte and suspended solids, passes to a classifier, in which the coarse solids are separated from the remainder of the pulp, which then passes to a continuous decanting thickener or thickeners, in which the electrolyte is separated from the slimes and colloids, the coarse solids and slimes and colloids being subsequently brought together to be delivered to the first of a series of leaching agitators.

The neutralized electrolyte from the decanting thickener or thickeners passes to the first of a series of precipitating agitators where it is agitated with metallic zinc, in suitable form, and then passes successfully through all of this series of agitators, where it is violently agitated to effect the precipitation of those metals electro-negative to zinc.

The flow from the last of the precipitating agitators passes through a trapped tank, for the collection and return to the precipitating agitators of any metallic zinc in the flow, and thence into a tank from which the now purified, neutralized electrolyte is pumped to filter-presses, which filter out the precipitated metals, the electrolyte then being, for all practical purposes, pure.

The electrolyte then flows to storage tanks, from which a sufficient quantity is fed as required to the electrolytic tanks in which the deposition of the zinc as metallic zinc is effected and the acid solvent is regenerated.

For operating efficiency, the temperature of the electrolyte and the degree of acidity in the electrolytic tanks may be suitably regulated, and the electrolysis may be carried on in the usual manner by the use of insoluble anodes and aluminum, zinc, or other suitable cathodes.

The acid solvent which has been regenerated from the electrolyte, in passing through the electrolytic reaction, is returned during the cycle of the process, through a storage tank or tanks and restored to the desired operating strength, and then passes to the first of the series of leaching agitators.

Upon entering the first of the series of leaching agitators, this regenerated acid solvent meets and is agitated with the solids and colloids separated from the neutralized electrolyte, the proportion of acid solvent being so regulated that the leached pulp, resulting from the mixture of the regenerated acid solvent and these solids, leaving the last leaching agitator, will be somewhat acid, in order that it may be free, or substantially free, from all undissolved soluble zinc.

The coarse solids are then separated from this pulp, by passing it through a classifier, and washing the coarse solids to separate out of them any entrained dissolved zinc and electrolyte before they are discharged from the classifier, the wash water being returned to the pulp and the coarse residual solids, which may be termed "coarse tailings," being disposed of according to the other values they may contain.

The remainder of the leached pulp then passes to the first of a series of decanting thickeners, which may be termed the "washing thickeners," where the dissolved values are washed out by counter-current decantation. This may be done by setting the series of washing thickeners in steps one above the other, the first of these thickeners, which receives the leached pulp, being at the lowest, and the final or discharge thickener, being at the highest, level of the series.

In this arrangement, the underflow of the first washing thickener, is pumped into the well of the second washing thickener, and so on throughout the series to the well of the last washing thickener, and while this is taking place, water is being added to the well of the last washing thickener, which, being at the highest level of the series, overflows to the next one, and so on throughout the series to the first washing thickener, and washes the leached pulp flowing counter to it, the overflow from the first of this series of thickeners being the partly neutralized electrolyte which meets the calcine passing to the neutralizing agitators, and the underflow from the last of this series of thickeners being the fine residual solids and colloids, which may be termed "slimes tailings," which go to the slimes pond.

From the foregoing description, it will be ascertained that the neutralization of a partly neutralized electrolyte may be completed by unleached calcine containing soluble zinc, that the solids and colloids are separated from the neutralized electrolyte and take a direction to meet the acid solvent regenerated during the electrolytic reaction, that the neutralized electrolyte takes a direction through the decanting, precipitating and filtering steps, to the electrolytic reaction, where the deposition of the zinc as metallic zinc is effected, and that the acid solvent thereby regenerated is returned to leach the solids and colloids separated from the neutralized electrolyte, and when decanted constitutes the partly neutralized electrolyte to meet the unleached calcine delivered to the neutralizing agitator, thus forming a continuous cycle of operations in which there is no loss of acid solvent except the mechanical loss in the tailings, and whatever enters into compounds discharged with the tailings, and in which the calcine is twice brought into contact with the acid solvent and twice separated therefrom (a) to complete the neutralization of the electrolyte and thus render possible its purification; and (b) to insure the complete solution of the soluble zinc in the solids and colloids separated from the neutralized electrolyte.

The accompanying drawing, representing a diagrammatic view of a flow sheet of a suitable apparatus by which the foregoing process may be carried out, is included as part of the application to illustrate the various stages of the process and the directions taken by the electrolyte and the solids.

From the roaster, the calcine is delivered to the neutralizing agitator or agitators, where it meets the partly neutralized electrolyte. The pulp, resulting from the mixture of calcine and electrolyte, passes to the classifier, where the coarse solids are separated from the pulp, which then passes through the neutral thickeners, precipitating agitators, trapped and other tanks, filter-press, storage tank or tanks, electrolytic tanks, where the zinc is deposited as metallic zinc and the acid solvent in the electrolyte is regenerated.

From the electrolytic tanks, the regenerated acid solvent passes through a storage tank or tanks to the leaching agitators, where it meets the solids and colloids separated from the neutralized electrolyte by the classifier and thickeners, and becomes partly neutralized, passing from the leaching agitators through the classifier, and washing thickeners to the neutral agitators.

The solids and colloids take a course from the classifier and neutral thickeners to the leading agitator, as presented by dash-and-dot lines, and the electrolyte takes a course through the neutralizing agitators, classifier, neutral thickener, precipitating agitators, tanks, filter-presses, electrolyte storage tank, electrolytic tanks, acid solvent storage tank, leaching agitators, classifier, and washing thickeners, to the neutral agitators, as indicated by a circle.

Having thus fully described the nature of our invention, what we claim as new and desire to secure by Letters Patent, is:—

1. A process for the hydrochemical extraction of zinc from its ores or zinc containing material in which the zinc has been previously rendered soluble, consisting of completing the neutralization of the acid solvent in an electrolyte by the addition of unleached calcine containing an excess of soluble zinc, separating the solids and colloids from the neutralized electrolyte, electrolytically regenerating the acid solvent in the electrolyte by electrolytic deposition of the zinc as metallic zinc, leaching the solids and colloids, which have been separated from the neutralized electrolyte, with the regenerated acid solvent to dissolve from the solids and colloids soluble zinc, the acid solvent thereby becoming partly neutralized, separating the partly neutralized electrolyte from the residual solids, and returning it to that stage of the process where it receives the unleached calcine to repeat the cycle of the process.

2. A process for the hydrochemical extraction of zinc from its ores or zinc containing material in which the zinc has been previously rendered soluble, consisting of completing the neutralization of the acid solvent in an electrolyte by the addition of unleached calcine containing an excess of soluble zinc, separating the solids and colloids from the neutralized electrolyte, precipitating those metals electro-negative to zinc out of the neutralized electrolyte, eliminating the precipitated metals, electrolytically regenerating the acid solvent in the electrolyte by electrolytic deposition of the zinc as metallic zinc, leaching the solids and colloids which have been separated from the neutralized electrolyte with the regenerated acid solvent to dissolve from the solids and colloids soluble zinc, the acid solvent thereby becoming partly neutralized, separating the partly neutralized electrolyte from the residual solids, and returning it to that stage of the process where it receives the unleached calcine to repeat the cycle of the process.

3. A process for the hydrochemical extraction of zinc from its ores or zinc containing material in which the zinc has been previously rendered soluble, consisting of completing the neutralization of the acid solvent in an electrolyte by the addition of unleached calcine containing an excess of soluble zinc, separating the solids and colloids from the neutralized electrolyte, precipitating those metals electro-negative to zinc out of the neutralized electrolyte by means of metallic zinc, eliminating the precipitated metals, electrolytically regenerating the acid solvent in the electrolyte by electrolytic deposition of the zinc as metallic zinc, leaching the solids and colloids which have been separated from the neutralized electrolyte with the regenerated acid solvent to dissolve from the solids and colloids soluble zinc, the acid solvent thereby becoming partly neutralized, separating the partly neutralized electrolyte from the residual solids, and returning it to that stage of the process where it receives the unleached calcine to repeat the cycle of the process.

4. A process for the hydrochemical extraction of zinc from its ores or zinc containing material, in which the zinc has been previously rendered soluble, consisting of completing the neutralization of the acid solvent in an electrolyte by the addition of unleached calcine containing an excess of soluble zinc, separating, precipitating, and filtering the solids and colloids out of the neutralized electrolyte, electrolytically regenerating the acid solvent in the electrolyte by electrolytic deposition of the zinc as metallic zinc, leaching the solids and colloids, which have been separated from the neutralized electrolyte, with the regenerated acid solvent to dissolve from the solids and colloids soluble zinc, the acid solvent thereby becoming partly neutralized, separating the partly neutralized electrolyte from the residual solids, and returning it to that stage of the process where it receives the unleached calcine to repeat the cycle of the process.

5. A cyclical process for the hydrochemical extraction of zinc from its ores or zinc containing material, in which the zinc has been previously rendered soluble, consisting of maintaining a continuous circulation of the electrolyte through the neutralizing, separating, purifying, electrolyzing and leaching stages and continuously combining with the electrolyte at the leaching stage, the solids and colloids removed from the electrolyte at the separating stage.

6. A cyclical process for the hydrochemical extraction of zinc from its ores or zinc containing material, in which the zinc has been previously rendered soluble, consisting of neutralizing, with an unleached calcine, a partly neutralized electrolyte and maintaining a continuous circulation of the electrolyte through the neutralizing, separating, purifying, electrolyzing and leaching stages and continuously combining with the electrolyte at the leaching stage, the solids and colloids removed from the electrolyte at the separating stage.

7. A cyclical process for the hydrochemical extraction of zinc from its ores or zinc containing material, in which the zinc has been previously rendered soluble, consisting of neutralizing, with an unleached calcine, a partly neutralized electrolyte, maintaining a continuous circulation of the electrolyte through the neutralizing, separating, purifying, electrolyzing and leaching stages, and continuously combining with the electrolyte at the leaching stage the solids and colloids separated from the electrolyte at the separating stage.

8. A cyclical process for the hydrochemical extraction of zinc from its ores or zinc containing material, in which the zinc has been previously rendered soluble, consisting of maintaining a continuous circulation of the electrolyte through the neutralizing, separating, purifying, electrolyzing and leaching stages, and continuously carrying on the process at each of these various stages and continuously combining with the electrolyte at the leaching stage, the solids and colloids removed from the electrolyte at the separating stage.

9. A cyclical process for the hydrochemical extraction of zinc from its ores or zinc containing material, in which the zinc has been previously rendered soluble, consisting of neutralizing, with an unleached calcine, a partly neutralized electrolyte, and maintaining a continuous circulation of the electrolyte through the neutralizing, separating, purifying, electrolyzing and leaching stages, and continuously carrying on the process at each of these various stages and continuously combining with the electrolyte at the leaching stage, the solids and colloids removed from the electrolyte at the separating stage.

10. A cyclical process for the hydrochemical extraction of zinc from its ores or zinc containing material, in which the zinc has been previously rendered soluble, consisting of neutralizing, with an unleached calcine, a partly neutralized electrolyte, maintaining a continuous circulation of the electrolyte through the neutralizing, separating, purifying, electrolyzing and leaching stages, continuously combining with the electrolyte at the leaching stage the solids and colloids separated from the electrolyte at the separating stage, and continuously carrying on the process at each of these various stages.

11. A cyclical process for the hydrochemical extraction of zinc from its ores or zinc containing material, in which the zinc has been previously rendered soluble, and the recovery of the zinc as metallic zinc by electrolytic deposition, consisting of completing the neutralization of the acid solvent in an electrolyte, by the addition of unleached calcine containing an excess of soluble zinc, separating the solids and colloids from the neutralized electrolyte, precipitating those metals electro-negative to zinc out of the neutralized electrolyte by means of metallic zinc, eliminating the precipitated metals, electrolytically regenerating the acid solvent in the electrolyte by electrolytic deposition of the zinc as metallic zinc, leaching the residues, including solids and colloids, which have been separated from the neutralized electrolyte, with the regenerated acid solvent which dissolves the soluble zinc from the residues, and thus becomes partly neutralized, separating the residual solids from the partly neutralized electrolyte, and returning it to that stage of the process where it receives the unleached calcine to repeat the cycle of the process.

12. A cyclical process for the hydrochemical extraction of zinc from its ores or zinc containing material, in which the zinc has been previously rendered soluble, and the recovery of the zinc as metallic zinc by electrolytic deposition, consisting of completing the neutralization of the acid solvent in an electrolyte, by the addition of unleached calcine containing an excess of soluble zinc, separating the solids and colloids from the neutralized electrolyte, precipitating those metals electro-negative to zinc out of the neutralized electrolyte, eliminating the precipitated metals, electrolytically regenerating the acid solvent in the electrolyte by electrolytic deposition of the zinc as metallic zinc, leaching the residues, including solids and colloids, which have been separated from the neutralized electrolyte, with the regenerated acid solvent which dissolves the soluble zinc from the residues, and thus becomes partly neutralized, separating the residual solids from the partly neutralized electrolyte, and returning it to that stage of the process where it receives the unleached calcine to repeat the cycle of the process.

13. A cyclical process for the hydrochemical extraction of zinc from its ores or zinc containing material, in which the zinc has been previously rendered soluble, consisting of completing the neutralization of a partly neutralized electrolyte by unleached calcine, maintaining a continuous circulation of the electrolyte through the neutralizing, separating, purifying, electrolyzing and leaching stages, and combining the solids and colloids, which have been separated from the electrolyte at the separating stage, with the acid solvent of the electrolyte regenerated at the electrolyzing stage.

14. A process for the hydrochemical extraction of zinc from its ores, or zinc containing material, in which the zinc has previously been rendered soluble, consisting of completing the neutralization of a partly neutralized electrolyte by the addition of unleached calcine, separating the solids and colloids out of the neutralized electrolyte, regenerating the acid solvent in the electrolyte by the electrolytic deposition of the zinc as metallic zinc, and leaching the solids and colloids, which have been separated from the neutralized electrolyte with the regenerated acid solvent, which then becomes partly neutralized, and then completing the neutralization of the partly neutralized electrolyte by the addition of unleached calcine.

Dated this 31st day of July, 1918.

Signed at the said city of Vancouver by ROBERT HOLDEN STEWART.

ROBERT HOLDEN STEWART.

In presence of—
 GORDON L. WRIGHT,
 DOROTHY WILSON.

Signed at the said city of Trail by SELWYN GWILLYM BLAYLOCK, ROBERT VAUGHAN, and JOHN KIMBALL BATCHELDER.

SELWYN GWILLYM BLAYLOCK.
    ROBERT VAUGHAN.
    JOHN KIMBALL BATCHELDER.

In the presence of—
 F. W. WARREN,
 C. A. MACKAY.